Dec. 7, 1926. 1,609,677

G. WAIMEL

SWIMMER'S SAFETY BELT

Filed May 25, 1925

INVENTOR.
George Waimel
BY
ATTORNEYS

Patented Dec. 7, 1926.

1,609,677

UNITED STATES PATENT OFFICE.

GEORGE WAIMEL, OF KITCHENER, ONTARIO, CANADA.

SWIMMER'S SAFETY BELT.

Application filed May 25, 1925. Serial No. 32,596.

This invention relates to improvements in belts, particularly belts worn by bathers and swimmers, and it is the principal object of my invention to provide a belt which, in case of emergency, may be used as a life saver.

Another object of the invention is the provision of a belt adapted to be worn as a sport belt and quickly to be transformed into a life-saving device.

A still further object of the invention is the provision of a belt which, in case of emergency, is adapted to be inflated by a gas normally carried in a receptacle in the belt, and adapted to readily be discharged by the simple turn of a screw to release the gas and fill the belt with the same.

It is also one of the objects of my invention to provide a belt of comparatively simple and inexpensive construction yet positively and efficiently operating in case of emergency to act as a life saver, and one which may be worn for instance, by passengers on sea-going vessels and will be normally inconspicuous and comfortable.

These and further objects and advantages of my invention will become more fully known, as the description thereof proceeds, and will then be specifically defined in the appended claims.

In the accompanying drawing, forming a material part of this disclosure:

Figure 1:
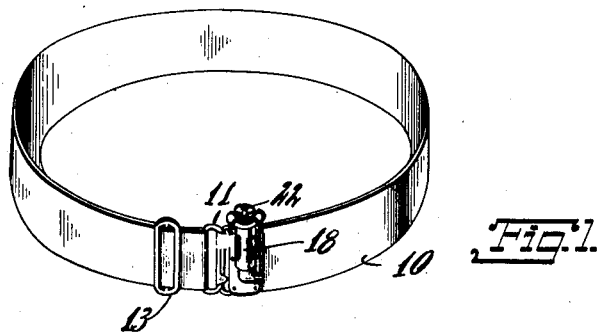
Fig. 1 is a perspective view of a belt constructed according to the invention.
Figure 2:
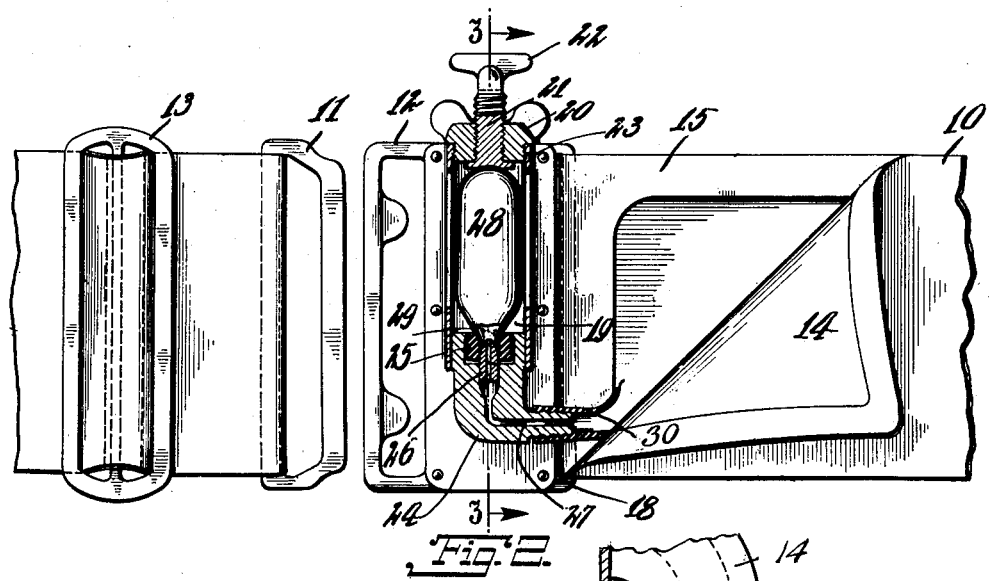
Fig. 2 is a fragmentary sectional view of the belt on a greatly enlarged scale.
Figure 3:
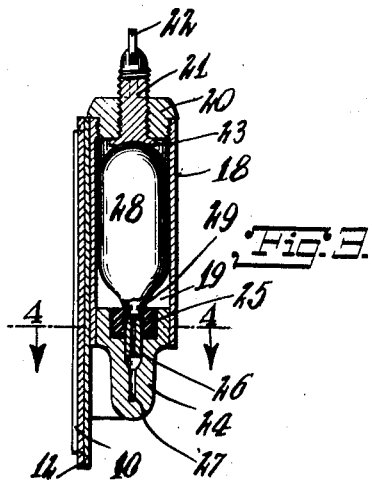
Fig. 3 is a cross-section on line 3—3 of Figure 2.
Figure 4:
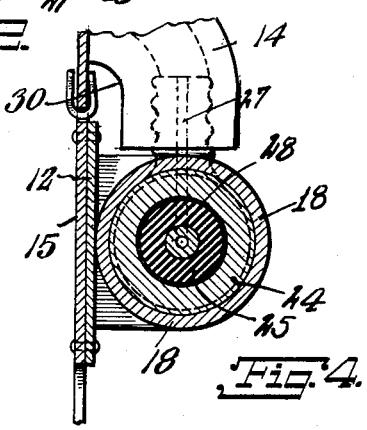
Fig. 4 is a fragmentary cross-section on line 4—4 of Figure 3.

The belt 10 of any suitable material and form has the customary locking device 11 and 12 and guide buckle 13 attached thereto, and is made of two-fold material as indicated at 14 and 15, to form an inner chamber.

At one of its ends, the belt has attached thereto a casing 18 in which an inner chamber 19 is formed, closed on top by a plug 20 screwed into the upper open end of chamber 19 and having a central threaded opening for the reception of the threaded shaft 21 of a screw having an upper operating handle 22 and a lower engaging shoulder or flange 23.

The lower end of chamber 19 is closed by a threaded plug 24 having an upper rubber plug 25 inserted therein and a perforated nipple 26 ending within said rubber plug 25. The nipple 26 is seated upon an angular conduit 27 leading into the chamber formed between the pieces of material 14 and 15 accomplished by the plug 24 engaging in socket 30, secured between said parts 14 and 15.

A vessel 28 or container is provided in chamber 19 and contains a buoyant gas and has a lower nipple 29 of glass or other fragile material, while its upper end is engaged by the flange 23 of screw 21.

The operation of the device will be entirely clear from the above description, in case of emergency, when the belt is to be used as a life-saver, it will simply be necessary to screw the screw 21 down so that the breakable nipple 29 of the container 28 will be broken by its contact with nipple 26 and the gas contained therein will flow into the belt in the space between the material 14 and 15 and make the belt buoyant.

It is to be understood that the form of the belt illustrated and described is only one example of its many ways of construction, and that such changes may be made as fall within the scope of the appended claims without departure from the spirit of my invention.

Having thus described my invention, what I claim as new, and desire to secure by Letters Patent, is:

1. In a swimmer's safety belt, having a gas container adapted to be forced against points to break, the combination in the means for inflating said belt, of a casing housing said gas container, a plug having a central threaded aperture, and engaged in the upper end of said casing, a threaded shaft operable in the threaded aperture of said plug, and having at its lower end a shoulder engaging said gas container, and at its upper end an operating handle, whereby upon turning the handle the said gas container is forced downwards relative to the casing.

2. In a swimmer's safety belt, having a gas container adapted to be forced against points to break, the combination in the means for inflating said belt, of a casing housing said gas container, a plug having a central threaded aperture, and engaged in the upper end of said casing, a threaded shaft operable in the threaded aperture of said plug, and having at its lower end a flange engaging said gas container, and at its upper end an operating handle, whereby upon turning the handle the said gas container is forced downwards relative to the casing.

3. A belt comprising a chamber formed therein, a casing formed in said belt, a gas contained in said casing, a nipple having an upper seat, a fragile nipple on the lower end of said container adapted to engage said seat, means for exerting a pressure upon the upper end of said container for breaking said fragile nipple to release the gas, and means to lead the gas into the chamber formed in said belt.

4. A belt comprising a chamber formed therein, a casing in said belt, a screw plug closing the upper mouth of said casing and a screw plug for closing the lower mouth thereof, a rubber seat formed in said last-named plug, a gas contained in said casing, a fragile nipple at the lower end of said container, a means passing through the upper screw plug to engage the upper end of said container, and an angular nipple formed in the lower screw plug having an upper solid seat for said fragile nipple and communicating with said belt chamber, and means for operating said means, pressing through the upper screw plug to break said fragile nipple to release the gas in said container and filling the belt chamber therewith.

5. A belt comprising a two-fold spaced material forming an inner chamber in said belt, a casing formed in said belt, an upper screw plug closing the top of said casing, and a lower screw plug for closing the bottom of said casing, an angular nipple in said lower screw plug communicating with said chamber, a rubber seat in said lower plug, a metal end on said nipple in said rubber seat, a gas container in said casing, a fragile nipple on the end of the same, engaging said metal end of the nipple, a screw having a shoulder engaging the upper end of said container, and a handle on said screw for allowing an operation of the same to break said fragile nipple on said container to release the gas contained therein, to flow through the lower nipple into the belt chamber, to make the same buoyant, and a means for attaching the belt to a person.

In testimony whereof I have affixed my signature.

GEORGE WAIMEL.